United States Patent
Soechting et al.

(10) Patent No.: US 6,860,108 B2
(45) Date of Patent: Mar. 1, 2005

(54) GAS TURBINE TAIL TUBE SEAL AND GAS TURBINE USING THE SAME

(75) Inventors: Friedrich Soechting, Miami, FL (US); Yasuoki Tomita, Takasago (JP); Shunsuke Torii, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 86 days.

(21) Appl. No.: 10/347,745

(22) Filed: Jan. 22, 2003

(65) Prior Publication Data

US 2004/0139746 A1 Jul. 22, 2004

(51) Int. Cl.⁷ .............................. F02C 1/00; F02G 3/00
(52) U.S. Cl. ..................... 60/752; 60/39.37; 60/800; 60/755
(58) Field of Search ............................ 60/752, 39.37, 60/755, 757, 754, 800

(56) References Cited

U.S. PATENT DOCUMENTS

| | | | | |
|---|---|---|---|---|
| 3,657,882 A | * | 4/1972 | Hugoson | 60/798 |
| 3,807,892 A | | 4/1974 | Frei et al. | |
| 4,195,474 A | * | 4/1980 | Bintz et al. | 60/730 |
| 4,353,679 A | | 10/1982 | Hauser | |
| 4,422,288 A | * | 12/1983 | Steber | 60/800 |
| 4,719,748 A | * | 1/1988 | Davis et al. | 60/39.37 |
| 4,872,312 A | * | 10/1989 | Iizuka et al. | 60/760 |
| 5,400,586 A | * | 3/1995 | Bagepalli et al. | 60/800 |
| 5,545,002 A | | 8/1996 | Bourguignon et al. | |
| 5,761,898 A | * | 6/1998 | Barnes et al. | 60/799 |
| 6,018,950 A | * | 2/2000 | Moeller | 60/752 |
| 6,450,762 B1 | * | 9/2002 | Munshi | 415/138 |
| 6,481,959 B1 | | 11/2002 | Morris et al. | |
| 6,571,560 B2 | * | 6/2003 | Tatsumi et al. | 60/753 |
| 6,751,962 B1 | * | 6/2004 | Kuwabara et al. | 60/800 |

FOREIGN PATENT DOCUMENTS

| | | |
|---|---|---|
| CH | 547 431 | 3/1974 |
| DE | 27 18 661 | 8/1986 |
| EP | 1 035 377 | 9/2000 |
| EP | 1 052 375 | 11/2000 |
| JP | 6-323544 | 11/1994 |

\* cited by examiner

Primary Examiner—Cheryl J. Tyler
Assistant Examiner—William H. Rodriguez
(74) Attorney, Agent, or Firm—Oblon, Spivak, McClelland, Maier & Neustadt, P.C.

(57) ABSTRACT

In order to provide a gas turbine tail tube seal which can prevent an outer shroud and an inner shroud in a first row stationary blade from being damaged by heat and from being worn, and to provide a gas turbine having the above-mentioned gas turbine tail tube seal, in the gas turbine tail tube seal, the width of a combustion gas flow channel in the gas turbine tail tube seal is smaller than the width of a combustion gas flow channel made between an outer surface of the inner shroud and an inner surface of the outer shroud, and the combustion gas flow channel is provided with inclined surfaces having a gradually enlarging cross section toward the first row stationary blade in at least a downstream end section.

5 Claims, 5 Drawing Sheets

GAS TURBINE TAIL TUBE SEAL AND GAS TURBINE USING THE SAME

BACKGROUND OF THE INVENTION

1. Field of the Invention

The present invention relates to a gas turbine tail tube seal which seals a space between a tail tube of a combustor and a combustion gas flow channel of a turbine, and a gas turbine using the same.

2. Description of Related Art

An ordinary gas turbine is provided with a compressor and a combustor (not shown in the drawings). According to such a gas turbine, compressed air which is compressed in the compressor is supplied to the combustor and mixed with a fuel which is supplied separately so as to be combusted. The combustion gas which is generated by such a combustion is supplied to the turbine so as to generate a rotational driving force in the turbine.

A structure of an ordinary combustor is shown in FIG. 4. In the drawing, reference numeral 1 indicates a combustor, and the combustor 1 is fixed inside a wheel chamber 2. Reference numeral 3 indicates a pilot fuel nozzle to which a pilot fuel for ignition is supplied. Reference numeral 4 indicates a plurality (for example, eight) of main fuel nozzles which are disposed circumferentially around the pilot fuel nozzle 3. Reference numeral 5 indicates an inner tube. Reference numeral 6 indicates a tail tube which introduces a high temperature combustion gas F into a tail tube outlet 6a. Reference numeral 7 indicates a bypass tube. Reference numeral 8 indicates a bypass valve which forms a flow channel and opens in order to introduce air inside the wheel chamber 2 into the combustor 1 when air for combustion is insufficient due to load fluctuations. Reference numeral 9 is a seal section which is disposed in an end section of the tail tube outlet 6a and seals connecting section of a combustion gas flow channel 10 (gas path) near the turbine. A plurality of such combustors 1 are disposed around a rotor (not shown in the drawing) in the wheel chamber 2. The high temperature combustion gas F which is ejected from these combustors expands in the combustion gas flow channel 10 so as to rotate the rotor.

In the combustor 1 having the above-mentioned structure, the fuel from the main fuel nozzle 4 is mixed with air which is taken in from the surroundings and ignited by a flame of the pilot fuel which is ejected from the pilot fuel nozzle 3 so as to be combusted to become the combustion gas F. The combustion gas F passes through the inner cylinder 5 and the tail tube 6 so as to be supplied to the gas path 10 via the tail tube outlet 6a. The wall of the inner tube 5 and the tail tube 6 of the combustor 1 is always in contact with the high temperature combustion gas F. Therefore, cooling air flows in a cooling path provided in the wall. Also, the tail tube outlet 6a is connected to an inlet of the combustion gas flow channel 10 via the seal section 9; thus, the seal section 9 is cooled by the air.

FIG. 5 is a magnified cross-sectional view of section A in FIG. 4 and shows the structure of a conventional tail tube seal. As shown in the drawing, a flange 6a1 is formed around the tail tube outlet 6a. Also, the wall of the tail tube 6 is cooled by the cooling air which flows in the flow channel (not shown in the drawing) which is formed in the wall. Also, a groove 6b which follows the cooling air to flow is formed around the tail tube outlet 6a; thus, the cooling air flows therein so as to cool the wall of the tail tube 6.

The tail tube outlet 6a is connected to the combustion gas flow channel 10 via a tail tube seal 11. A groove 11a having a U-shaped cross section is formed in an end section of the tail tube seal 11. The flange 6a1 of the tail tube outlet 6a is fit into the groove 11a. A groove having a rectangular cross section is formed in another end section of the tail tube seal 11. A flange section 13a of an outer shroud 13 and a flange section 14a of an inner shroud 14 of a first row stationary blade 12 in the combustion gas flow channel 10 fit into the groove 11b so as to seal the connection section.

A plurality of cooling holes 11c are formed in the tail tube seal 11 for allowing cooling air c to flow in order to cool the tail tube seal 11 and a film of the outer shroud 13 and the inner shroud 14 in the first row stationary blade 12. These cooling holes 11c are formed in an inclined manner over the outer surface and the inner surface of the tail tube seal 11. The wall of the tail tube seal 11 is cooled by allowing the cooling air c, which is highly compressed in the wheel chamber 2 to flow, to these cooling holes 11c. Furthermore, the combustion gas F which is ejected from each cooling hole 11c to the combustion gas flow channel 10, covers the inner surface of the outer shroud 13 and the outer surface of the inner shroud 14 to cool the film.

However, in the conventional tail tube seal 11, there have been the following problems.

That is, there was a concern that the film cooling operation is not effective in the conventional tail tube seal 11. Also, there was a case in which an upstream section of the outer shroud 13 and the inner shroud 14 was damaged by heat, and there was a case in which the fitting section, which fits the tail tube seal 11 to the outer shroud 13 and the inner shroud 14 became worn due to a repetitive thermal expansion. These problems are believed to occur due to the following reasons (1) to (3).

(1) The dimension of the space between the downstream end of the tail tube seal 11 to the upstream end of the outer shroud 13 and the inner shroud 14 must be large when taking the thermal expansion of each component into account. Therefore, the positions of the upstream end of the outer shroud 13 and the upstream end of the inner shroud 14 become far from the position of each cooling hole 11e.

(2) The cooling air c is ejected form each cooling hole 11c so as to enter the combustion gas flow channel 10 in an inclined manner. Therefore, the flow of the cooling air c for cooling the film cannot be formed well along the inner surface of the outer shroud 13 and the outer surface of the inner shroud 14.

(3) The cooling air c collides with an edge of the upstream end of the outer shroud 13 and the inner shroud 14, and a vortex flow occurs when the width of the combustion gas flow channel in the tail tube seal 11 becomes larger than the width of the combustion gas flow channel made between the outer shroud 13 and the inner shroud 14 due to a reason such as thermal expansion.

The present invention was made in consideration of the above-mentioned problems. The objects of the present invention are to provide a gas turbine tail tube seal which can prevent an outer shroud and an inner shroud in a first row stationary blade from being damaged by heat and from being worn, and to provide a gas turbine having the above-mentioned gas turbine tail tube seal.

SUMMARY OF THE INVENTION

In the present invention, the following structure is employed in order to solve the above-mentioned problems.

That is, a gas turbine tail tube seal according to a first aspect of the present invention is characterized in that, in the gas turbine tail tube seal which seals a space between a tail tube of a combustor and an inner shroud and an outer shroud in a first row stationary blade and which supplies cooling air to the inner shroud and the outer shroud, the width of a combustion gas flow channel in the gas turbine tail tube seal when viewed from a cross section which includes the center axis line thereof is smaller than the width of a combustion gas flow channel made between an outer surface of the inner shroud and an inner surface of the outer shroud; the combustion gas flow channel is provided with inclined surfaces having a gradually enlarging cross section toward the first row stationary blade in at least a downstream end section.

According to the gas turbine tail tube seal of the first aspect of the present invention, because the width of the combustion gas flow channel is made smaller than the width of the combustion gas flow channel in the first row stationary blade, the combustion gas which flows into the combustion gas flow channel in the first row stationary blade from the combustion gas flow channel in the gas turbine tail tube seal is not blocked by the edge of the upstream end of the inner shroud and the outer shroud and does not form a vortex flow. Furthermore, because the combustion gas flow channel in the gas turbine tail tube seal is provided with inclined surfaces having a gradually enlarging cross section toward the first row stationary blade; thus, it is possible to prevent a vortex flow due to a rapid stepwise change of the width of the combustion gas flow channel from occurring when the combustion gas flows into the combustion gas flow channel in the first row stationary blade from the gas turbine tail tube seal.

The gas turbine tail tube seal according to a second aspect of the present invention is characterized in that in the gas turbine tail tube seal which seals the space between the tail tube of the combustor and the inner shroud and the outer shroud in the first row stationary blade and supplies cooling air to the inner shroud and the outer shroud, the downstream end section having an outlet for ejecting the cooling air in the gas turbine tail tube seal covers the upstream outer surface of the inner shroud and the upstream inner surface of the outer shroud.

According to the gas turbine tail tube seal of the second aspect of the present invention, the downstream end section covers the upstream outer surface of the inner shroud and the upstream inner surface of the outer shroud so as not to contact the high temperature combustion gas directly. Also, it is possible to dispose the tail tube outlet at position closer to the upstream outer surface of the inner shroud and the upstream inner surface of the outer shroud.

The gas turbine tail tube seal according to a third aspect of the present invention is characterized in that, in the gas turbine tail tube seal, according to the second aspect of the present invention, a plurality of outlets are provided which correspond to each of the inner shroud and the outer shroud when viewed from a cross section including the gas turbine tail tube seal and its center axis line.

According to the gas turbine tail tube seal of the third aspect of the present invention, of the cooling air which is ejected from each outlet, even if the cooling air which is closest to the combustion gas flow channel forms a vortex flow, the cooling air which is ejected from the other outlets compensates for the vortex flow; thus, it is possible to form a cooling air flow over the upstream outer surface of the inner shroud and the upstream inner surface of the outer shroud.

The gas turbine tail tube seal according to a fourth aspect of the present invention is characterized in that, in the gas turbine tail tube seal according to the third aspect of the present invention, the width of the combustion gas flow channel in the gas turbine tail tube seal, when viewed from a cross section which includes the center axis line thereof is smaller than the width of a combustion gas flow channel made between the outer surface of the inner shroud and an inner surface of the outer shroud; the combustion gas flow channel is provided with inclined surfaces which have a gradually enlarging diameter toward the first row stationary blade in at least the downstream end section.

According to the gas turbine tail tube seal of the fourth aspect of the present invention, the same effect as that of the first aspect of the present invention is obtained. That is, the combustion gas which flows into the combustion gas flow channel in the first row stationary blade from the combustion gas flow channel in the gas turbine tail tube seal is not blocked by the edge of the upstream end of the inner shroud and the outer shroud and does not form a vortex flow. Furthermore, it is possible to prevent a vortex flow due to a rapid stepwise change of the width of the combustion gas flow channel from occurring when the combustion gas flows into the combustion gas flow channel in the first row stationary blade from the gas turbine tail tube seal.

A gas turbine according to a fifth aspect of the present invention is characterized in that, in the gas turbine having a compressor and a combustor, the gas turbine tail tube seal according to the first or fourth aspect of the present invention is provided between the combustor and the turbine.

According to the gas turbine of the fifth aspect of the present invention, a main stream flow of the combustion gas becomes smooth over the gas turbine tail tube seal and the first row stationary blade; thus, it is possible to prevent a vortex flow from occurring.

The gas turbine tail tube seal according to the first aspect of the present invention employs a structure in which the width of the combustion gas flow channel in the gas turbine tail tube seal is smaller than the width of the combustion gas flow channel made between the inner shroud and the outer shroud; and the inclined surfaces having a gradually enlarging cross section toward the first row stationary blade in at least the downstream end section is provided. According to such a structure, because the main flow of the combustion gas F over the gas turbine tail tube seal and the first row stationary blade becomes smooth, it is possible to prevent the vortex flow from occurring. Therefore, it is possible to prevent the outer shroud and the inner shroud in the first row stationary blade from being damaged by heat and from being worn.

The gas turbine tail tube seal according to the second aspect of the present invention employs a structure in which the downstream end section having an outlet covers the upstream outer surface of the inner shroud and the upstream inner surface of the outer shroud. According to such a structure, it is possible to protect an upstream outer surface 22a and an upstream inner surface 23a from the high temperature combustion gas. In addition, each outlet of the cooling air can be disposed closer to the upstream outer surface 22a and the upstream inner surface 23a. Therefore, it is possible to cool the upstream section of the inner shroud and the outer shroud reliably; thus, it is possible to prevent them from being damaged by heat and from being worn-out.

The gas turbine tail tube seal according to the third aspect of the present invention employs a structure in which a plurality of the outlets are provided, when viewed from a cross section which includes its center axis line. According to such a structure, it is possible to prevent a vortex flow of the cooling air from occurring in the space made between the downstream end section of the gas turbine tail tube seal and the upstream end section made between the inner shroud and the outer shroud. Therefore, it is possible to cool the film of the upstream outer surface of the inner shroud and the film of the upstream inner surface of the outer shroud reliably.

The gas turbine tail tube seal according to the fourth aspect of the present invention employs a structure in which the width of the combustion gas flow channel is smaller than the width of the combustion gas flow channel made between the inner shroud and the outer shroud, and the inclined surfaces having a gradually enlarging diameter toward the first row stationary blade in at least the downstream end section are provided. According to such a structure, it is possible to obtain the same effect as that obtained in the first aspect of the present invention. That is, it is possible to prevent the outer shroud and the inner shroud from being damaged by heat and from being worn.

The gas turbine according to the fifth aspect of the present invention employs a structure in which the gas turbine tail tube seal according to the first or the fourth aspect of the present invention is provided. By doing this, a flow of a main stream of the combustion gas becomes smooth over the gas turbine tail tube seal and the first row stationary blade; thus, it is possible to prevent a vortex flow from occurring. Therefore, it is possible to prevent the outer shroud and the inner shroud from being damaged by heat and from being worn.

DETAILED DESCRIPTION OF THE INVENTION

Figure 1:
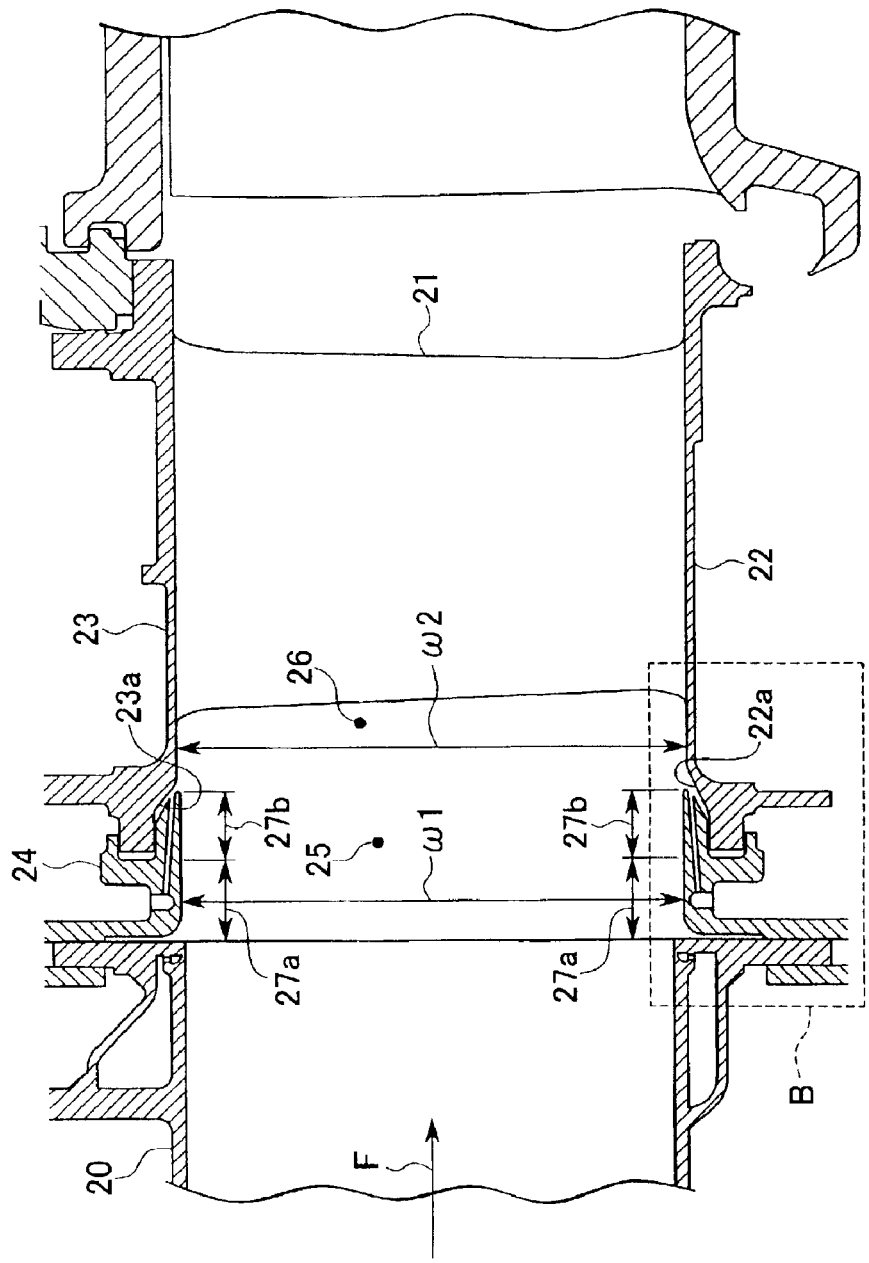
FIG. 1 is a cross sectional view as viewed from a cross section including an axis line of the rotor, and shows an example of an embodiment of the gas turbine tail tube seal which is provided in the gas turbine according to the present invention.

An embodiment of a gas turbine using the gas turbine tail tube seal according to the present invention is explained as follows with reference to the drawings. It will be apparent that the invention can be embodied in a wide variety of forms, some of which may be quite different from those of the disclosed embodiments. Consequently, the specific structural and functional details disclosed herein are merely representative and do not limit the scope of the invention.

A gas turbine according to the present invention is provided with a compressor and a combustor (not shown in the drawings). According to such a gas turbine, compressed air which is compressed in the compressor is supplied to the combustor and mixed with a fuel which is supplied separately so as to be combusted. The combustion gas which is generated by such a combustion is supplied to the turbine so as to generate a rotational driving force in the turbine. Inside this turbine, a plurality of turbine blades which are attached on a rotor circumferentially and a plurality of turbine stationary blades which are attached to a stationary section around the rotor are disposed alternately in the direction of the rotational axis of the rotor. Furthermore, a combustion gas flow channel for passing the compressed combustion gas is formed in the turbine. Therefore, the combustion gas which is introduced from the combustor into the combustion gas flow channel rotates each turbine blade and applies a rotational force to the rotor. The rotational force rotates a generator (not shown in the drawings) which is connected to the rotor so as to generate electricity.

Figure 2:
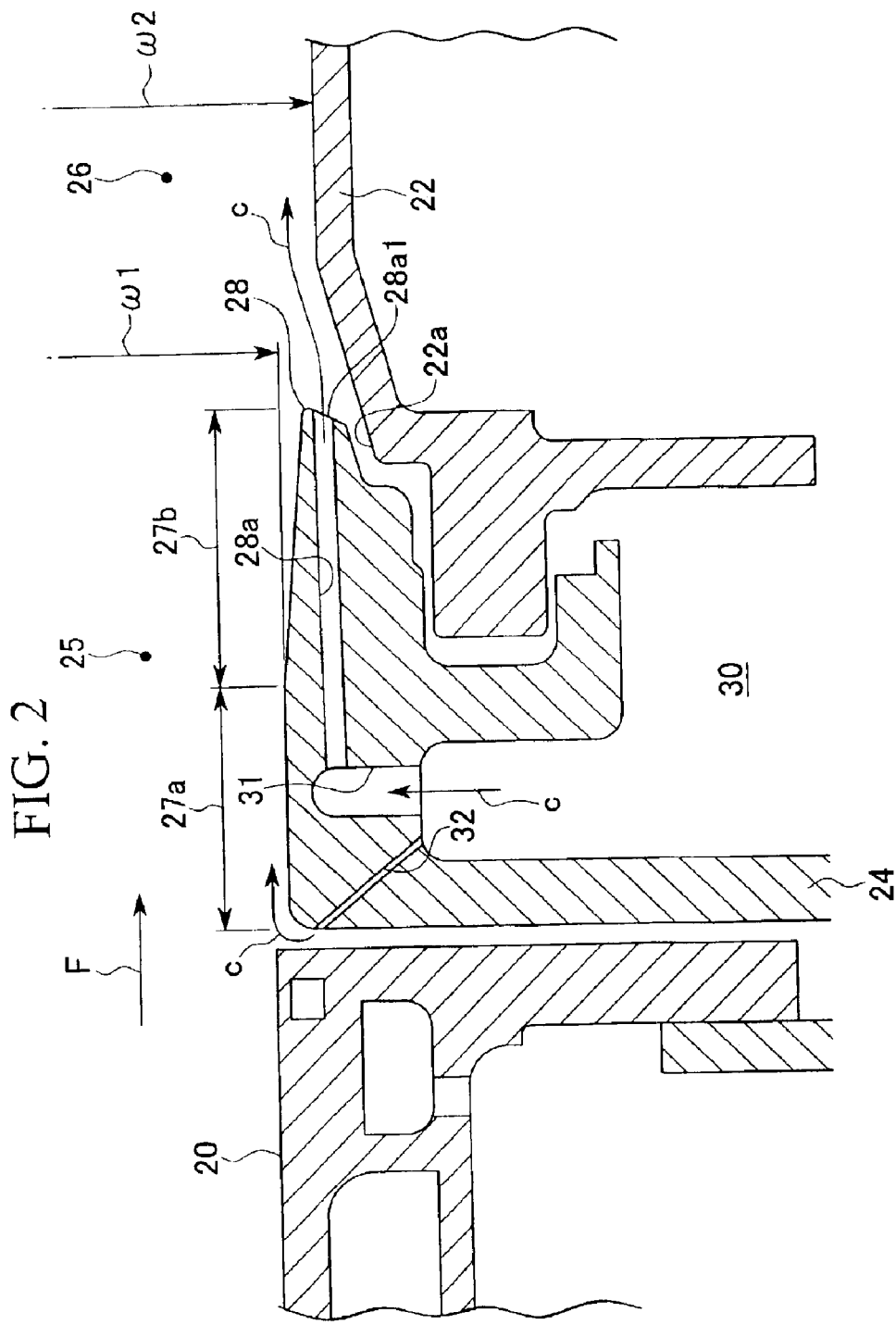
FIG. 2 is an enlarged cross-sectional view showing a portion B of the gas turbine tail tube seal in FIG. 1.

In FIGS. 1 and 2, a gas turbine tail tube seal 24 according to the present embodiment which seals a space between a tail tube 20 of the combustor and an inner shroud 22 and an outer shroud 23 in a first row stationary blade 21 in the turbine and which supplies cooling air to the inner shroud 22 and the outer shroud 23 is shown. In the following explanation, upstream is taken to be the upstream side along the direction of the flow of the combustion gas F (left-hand side in the drawing), and downstream is taken to be the opposite direction (right-hand side in the drawing).

As shown in the drawings, a width w1 of the combustion gas flow channel (hereinafter called a tail tube seal gas flow channel 25) which is formed in the gas turbine tail tube seal 24 according to the present embodiment is smaller than a width w2 of a combustion gas flow channel (hereinafter called a stationary blade gas flow channel 26) formed between the outer surface 22a of the inner shroud 22 and the inner surface 23a of the outer shroud 23.

When viewed from a cross section which includes the central axis line of the gas turbine tail tube seal 24, the tail tube seal gas flow channel 25 is formed by a pair of parallel surfaces 27a which are parallel to the central axis line at the upstream portion and a pair of inclined surfaces 27b at the downstream portion which connects the parallel surfaces 27a and have a cross section which gradually enlarges toward the first row stationary blade 21.

The width w1 indicates the distance between the parallel surfaces 27a. If the tail tube seal gas flow channel 25 is formed by these parallel surfaces 27a, in a connecting section with the stationary blade gas flow channel 26 having the width w2 which is wider than w1, gaps are formed in the flow channel; thus, there is a concern that a vortex flow of the combustion gas occurs. By removing such gaps and disposing a pair of inclined surfaces 27b which flow channel width is gradually enlarged, the combustion gas F flows smoothly from the tail tube seal gas flow channel 25 to the stationary blade gas flow channel 26.

From the point of view of optimum design, it is preferable to form the parallel surfaces 27a as a uniform surface with the upstream outer surface 22a of the inner shroud 22, and the upstream inner surface 23a of the outer shroud 23, instead of providing the inclined surfaces 27b. However, it is actually difficult to design such a structure in such an optimum way; therefore, the present embodiment employs a structure in which the width w1 which is slightly smaller than the width w2. This is because there is a concern that the combustion gas F may collide with an upper end of the inner shroud 22 and the outer shroud 23, and these shrouds may be damaged by heat if the width w1 is larger than the width w2.

Furthermore, in the gas turbine tail tube seal 24 according to the present invention, a downstream end section 28 having a plurality of outlets 28a1 for ejecting the cooling air c covers a portion of the upstream outer surface 22a of the inner shroud 22 and the upstream inner surface of the outer shroud 23.

That is, the distance between the upstream outer surface 22a and the upstream inner surface 23a increases gradually toward the connecting location with the gas turbine tail tube seal 24; thus, inclined surfaces are formed. Furthermore, the downstream end section 28 overlaps a portion of the inclined surface so as to cover from the stationary blade gas flow channel 26.

Each outlet 28a1 is an outlet of a cooling hole 28a which is parallel to the central axis line (that is, the flowing direction of the combustion gas F from the tail tube seal gas flow channel 25 to the stationary blade gas flow channel 26) of the gas turbine tail tube seal 24. The outlets 28a1 are connected to a plurality of introduction holes 31 for introducing the cooling air c (an air bleed from the compressor) which is supplied to a peripheral space 30 around the gas turbine tail tube seal 24.

Also, in the gas turbine tail tube seal 24, a plurality of air bleed holes 32 for introducing the cooling air c from the peripheral space 30 toward the upstream end section are formed. These air bleed holes 32 communicate with a connecting section between the gas turbine tail tube seal 24 and the tail tube 20; thus, it is possible to cool the film of the parallel surfaces 27a and the inclined surfaces 27b.

Consequently, in the gas turbine tail tube seal 24 having the above-mentioned structure, the combustion gas F from the tail tube 20 flows to the stationary blade gas flow channel 26 via the tail tube seal gas flow channel 25. By making the width w1 smaller that the width w2, the flow of the combustion gas F is not blocked by the edge of the upstream end of the inner shroud 22 and the outer shroud 23 when the combustion gas F flows into the stationary blade gas flow channel 26 from the tail tube seal gas flow channel 25; thus, the vortex flow does not occur. In addition, the tail tube seal gas flow channel 25 is provided with a pair of inclined surfaces 27b having a cross section which enlarges gradually toward the first row stationary blade 21; therefore, it is possible to prevent a vortex flow which is caused by a rapid stepwise change of the width of the flow channel when the combustion gas F flows into the stationary blade gas flow channel 26 from the tail tube seal gas flow channel 25.

Furthermore, in the gas turbine tail tube seal 24, a portion of the upstream outer surface 22a and a portion of the upstream inner surface 23a are covered by the downstream end section 28. Therefore, it is possible to prevent the upstream outer surface 22a and the upstream inner surface 23a from contacting the high temperature combustion gas F, and it is possible that each outlet 28a1 can be disposed closer to the upstream outer surface 22a and the upstream inner surface 23a.

The cooling air c in the peripheral space 30 is introduced into each introduction hole 31 and ejected to the stationary blade gas flow channel 26 from each outlet 28a1 via the cooling holes 28 which are formed corresponding to each of the introduction holes 31. The cooling air c cools the wall of the gas turbine tail tube seal 24 and also cools the film which covers the upstream outer surface 22a of the inner shroud 22 and the upstream inner surface 23a of the outer shroud 23.

Also, the cooling air c which is introduced into the air bleed holes 32 from the peripheral space 30 cools the film which covers the parallel surfaces 27a and the inclined surfaces 27b.

According to the above-mentioned gas turbine tail tube seal 24 of the present embodiment, it is possible to protect the upstream outer surface 22a and the upstream inner surface 23a from the high temperature combustion gas F. In addition, each outlet 28a1 can be disposed closer to the upstream outer surface 22a and the upstream inner surface 23a. Therefore, the upstream section of the inner shroud 22 and the outer shroud 23 can be cooled reliably; thus, it is possible to prevent these structure from being damaged by heat and to prevent the above-mentioned fitting section from being worn.

Figure 3:
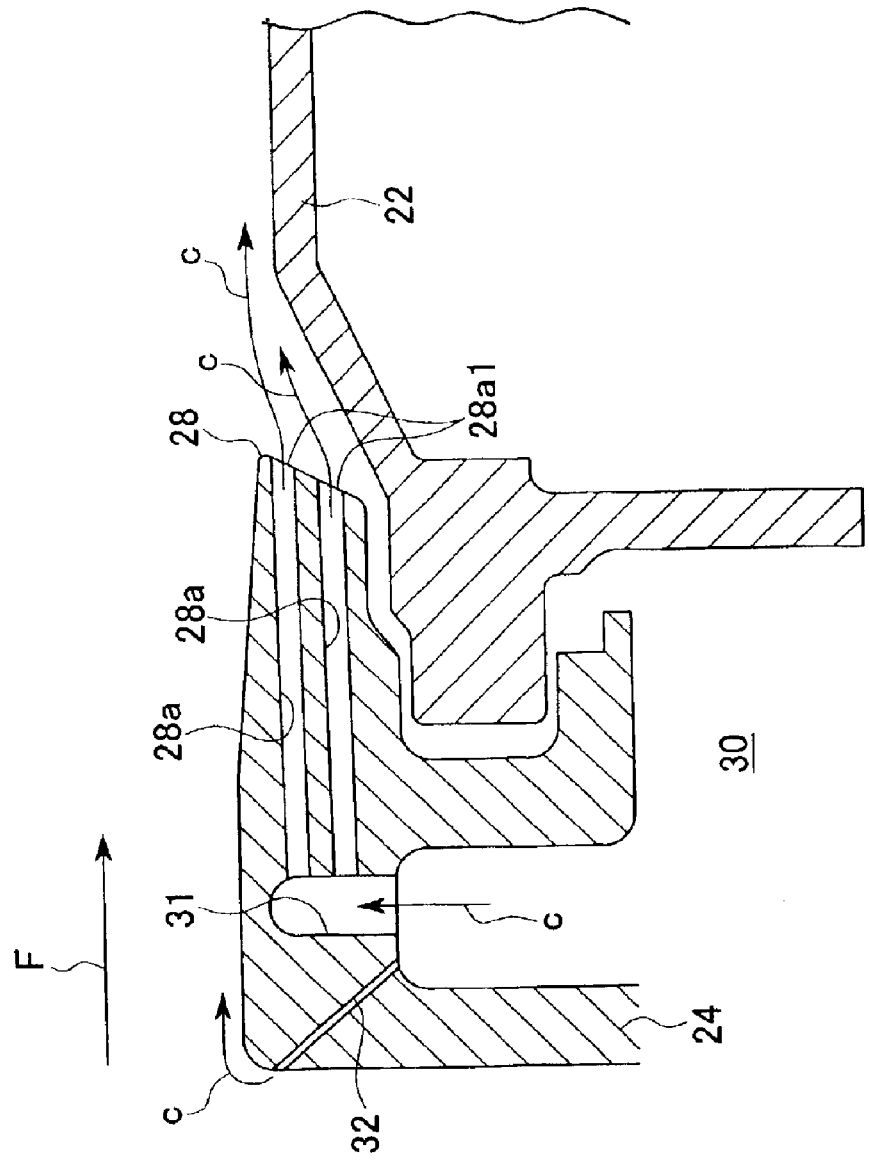
FIG. 3 is an enlarged cross section showing a modified embodiment of the gas turbine tail tube seal shown in FIG. 2.
Figure 4:
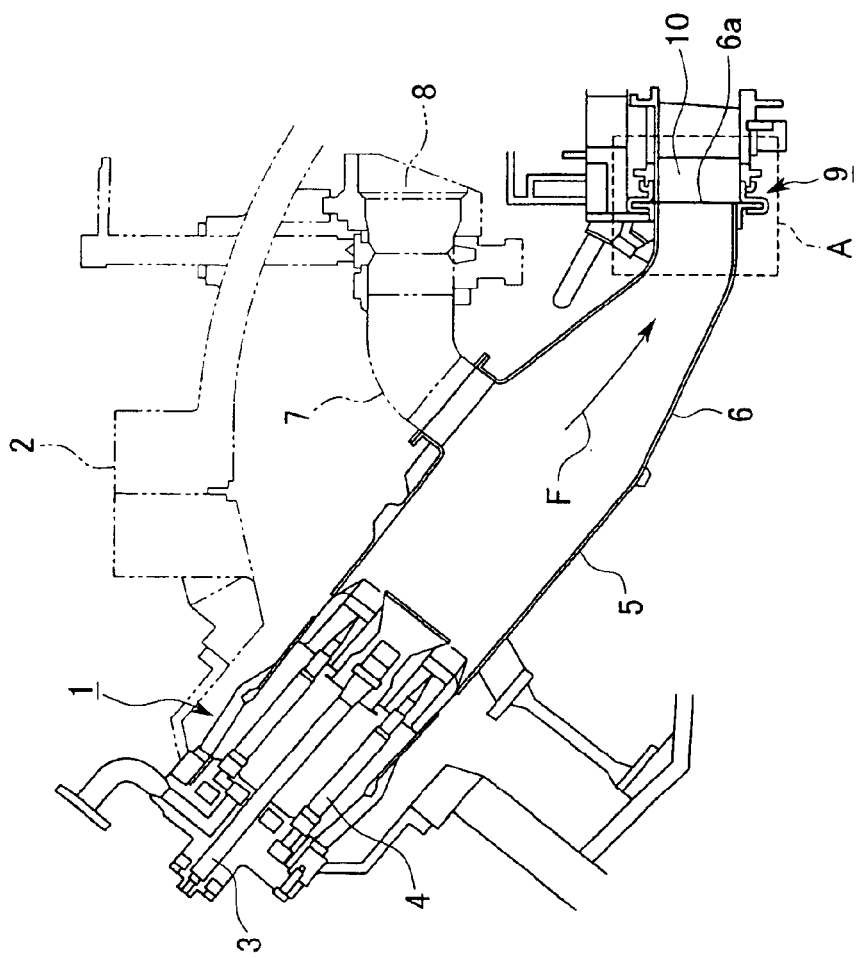
FIG. 4 is a view showing a main portion of the gas turbine having the conventional gas turbine tail tube seal and showing the relative positions corresponding to the combustor and the first row stationary blade.
Figure 5:
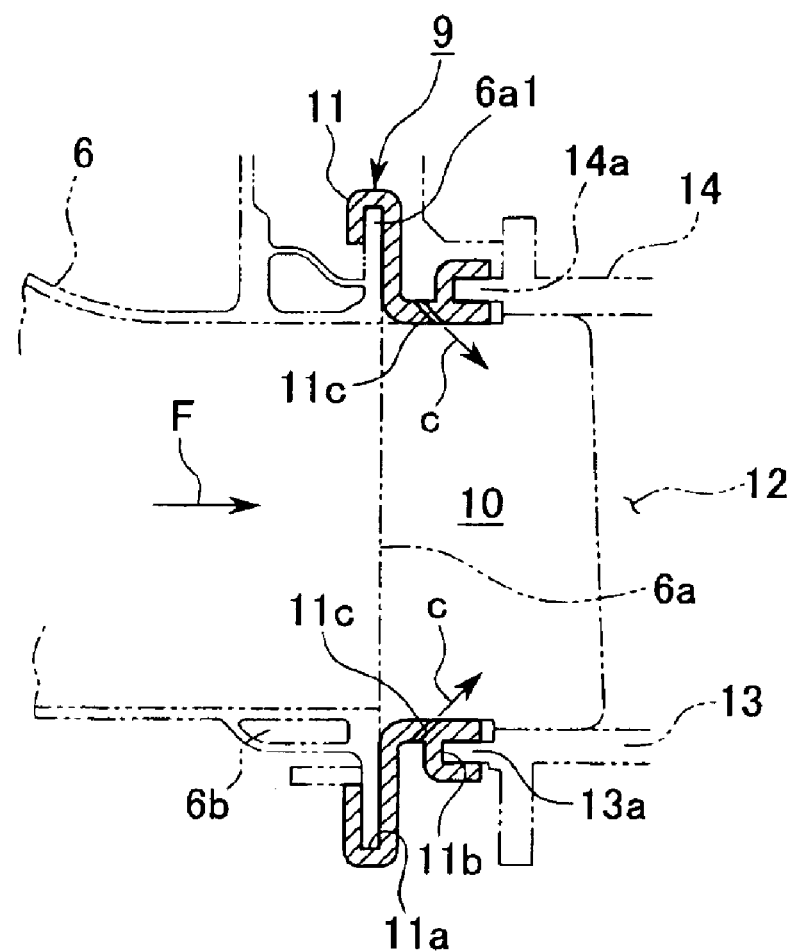
FIG. 5 is a cross section of a portion A of the conventional gas turbine tail tube seal in FIG. 4.

In the above-mentioned embodiment, one outlet 28a1 is formed for each of the inner shroud 22 and the outer shroud 23 when the gas turbine tail tube seal 24 is viewed from a cross section (the cross section shown in FIG. 2) which includes the central axis line thereof. However, the present invention can be embodied in a wide variety of forms such as with two or three outlets 28a1 as shown in FIG. 3.

Of the cooling air c which is ejected from each outlet 28a1, even if the cooling air c which is closest to the combustion gas flow channel 26 forms a vortex flow, the cooling air c which is ejected from the other outlets 28a1 compensates for the vortex flow. Therefore, it is possible to prevent a vortex flow of the cooling air c from occurring in the space between the downstream end section 28 of the gas turbine tail tube seal 24 and the upstream end section made between the inner shroud 22 and the upstream end section of the outer shroud 23. Therefore, it is possible to rapidly cool the film of the upstream outer surface 22a and the film of the upstream inner surface 23a.

What is claimed is:

1. A gas turbine tail tube seal configured to seal a space between a tail tube of a combustor and an inner shroud and an outer shroud in a first row stationary blade and to supply cooling air to the inner shroud and the outer shroud, wherein a width of an upstream portion of the gas turbine tail tube seal is smaller than a width of a combustion gas flow channel formed between an outer surface of the inner shroud and an inner surface of the outer shroud, and a downstream portion of the gas turbine tail tube seal is provided with an inclined surface gradually enlarging a cross sectional area of the seal toward the first row stationary blade.

2. The gas turbine tail tube seal according to claim 1, wherein a downstream end section of the seal having an outlet for ejecting the cooling air in the gas turbine tail tube seal covers an upstream outer surface of the inner shroud and an upstream inner surface of the outer shroud.

3. The gas turbine tail tube seal according to claim 1, wherein a plurality of outlets for cooling air are provided in the seal which correspond to the inner shroud and the outer shroud when viewed from a cross section including the gas turbine tail tube seal and a center axis line thereof.

4. The gas turbine tail tube seal according to claim 1, wherein a plurality of air bleed holes are provided in said seal, said plurality of air bleed holes being configured to provide air to cool the upstream portion of the seal.

5. A gas turbine having a compressor and a combustor wherein the gas turbine tail tube seal according to claim 1 or 4 is provided between the combustor and the turbine.

* * * * *